UNITED STATES PATENT OFFICE.

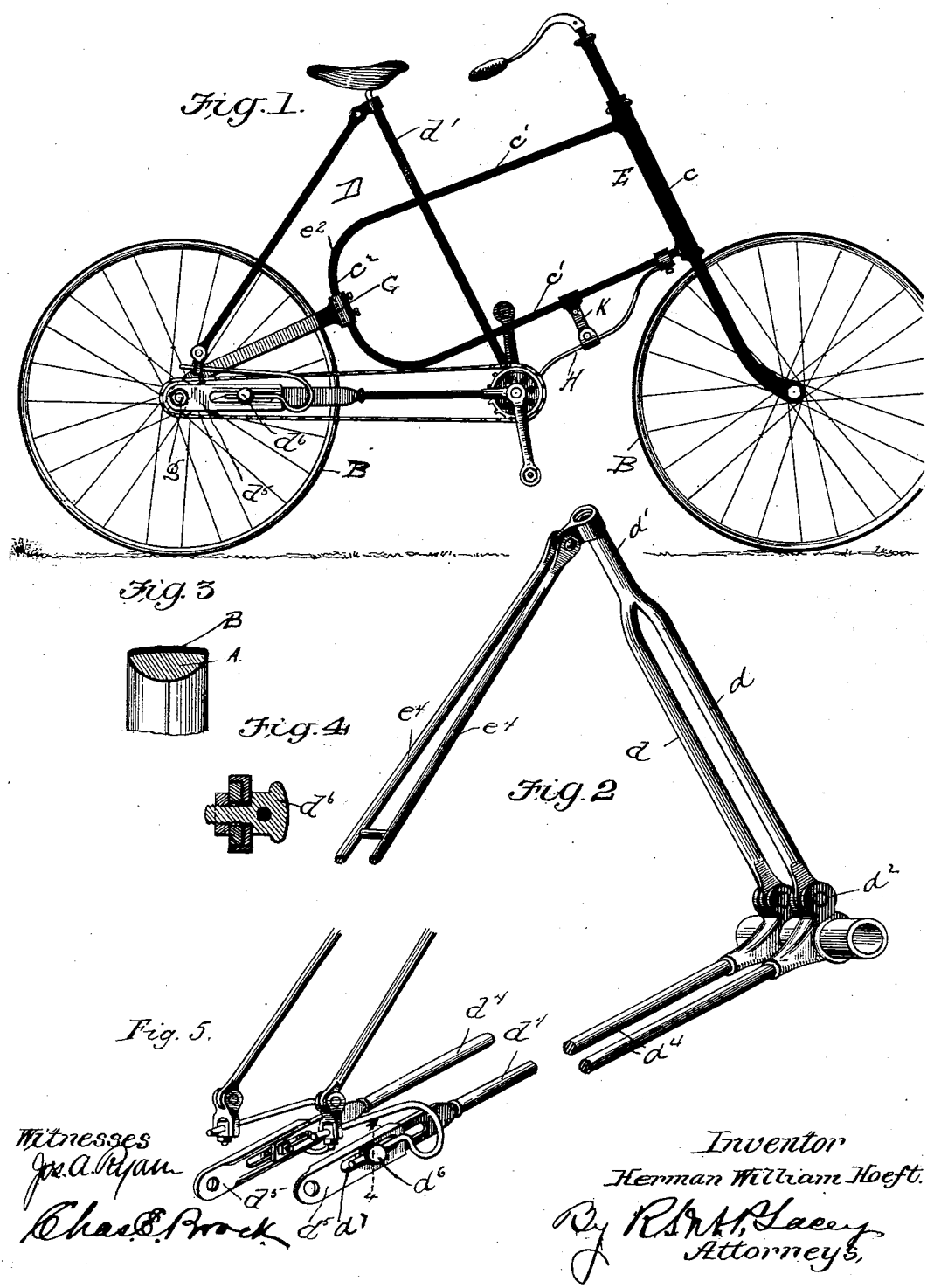

HERMAN WILLIAM HOEFT, OF LA CROSSE, WISCONSIN.

BICYCLE.

SPECIFICATION forming part of Letters Patent No. 588,109, dated August 10, 1897.

Application filed November 26, 1895. Serial No. 570,204. (No model.)

*To all whom it may concern:*

Be it known that I, HERMAN WILLIAM HOEFT, of La Crosse, in the county of La Crosse and State of Wisconsin, have invented an Improved Safety-Bicycle, of which the following is a specification.

This invention relates generally to bicycles, and particularly to the construction of the frame and the tire, the object of the invention being to provide a simple construction of bicycle which shall dispense with the pneumatic tire, and I provide a bicycle which shall ride as smooth or easy as one provided with the improved form of pneumatic tires.

Another object is to provide an improved construction of bicycle-frame, such that the saddle and pedals will always maintain the same relation, and thus avoid liability of the rider's feet being thrown from said pedals while riding over rough or uneven ground.

Another object is to provide an improved construction of handle-bar which will avoid the jar of the front wheel being communicated to the arms of the rider.

With these and such other objects as may hereinafter appear my invention consists in the peculiar construction of the various parts and the novel manner of combining or arranging said parts, all of which will be fully described hereinafter and pointed out in the claim.

In the drawings forming a part of this specification, Figure 1 is a side elevation of a bicycle constructed in accordance with my invention. Fig. 2 is a detail perspective view of a portion of the frame, and Figs. 3, 4, and 5 show details of construction.

In carrying out my invention I construct the wheel with a wooden or metallic rim A, which is preferably convexed upon its outer face, and strapped upon said convexed face of the rim is a rubber-band tire B, cemented or otherwise secured to the wooden or metallic rim.

The tire is preferably made about two inches in width, so that in effect it will be the same as the pneumatic tire now in use, except as to the quality of elasticity, and in order to overcome this objection I construct an improved form of spring-frame consisting, essentially, of two parts—namely, the forward part E and the rear part D.

The forward part is essentially rectangular in shape and comprises the tubular standard $c$, through which the steering head or post passes, and extending rearwardly from this tubular standard are the parallel members $c'$ $c'$, connected at their rear ends by the bow $c^2$.

The rear part D is essentially triangular in shape, and each end of said triangular frame rests upon the rear axle, and the seat rests upon the upper end of said frame, while the sprocket-shaft is journaled in the forward end of said frame.

The triangular frame D is made of two parallel sections $d$, connected at their upper ends at $d'$, in which is secured the seat-post $e$, and at their forward ends said sections $d$ are united by means of the bearings $d^2$, in which the sprocket-shaft turns.

The lower members of the triangular frame are composed of two pieces—namely, the bar $d^4$ and the plate $d^5$, said plate $d^5$ being channel shape in cross-section to receive the flattened end of the bar $d^4$, said bar and plate being secured by means of a bolt $d^6$, which passes through the registering slots $d^7$ produced in the plate and flattened ends of the bar, and by means of these elongated slots the length of the lower members can be adjusted as desired for the purpose of taking up the slack in the chain.

The rear ends of the plates $d^5$ can be slotted horizontally or vertically to provide for a horizontal or vertical adjustment of the rear axle, which is journaled in said slots.

Connected to the bow member of the rectangular frame is a forked frame G, which is slotted at its rear end $g$ and rests upon the rear axle, said forked frame providing the rear support for the rectangular frame.

The forward end of the triangular frame is supported upon a stout spring H, which is secured at its forward end to the under side of the lower member of the rectangular frame and rests about midway of its length in an adjustable stirrup K, which is also attached to the said lower member, and by supporting the forward end of said frame upon this spring the triangular frame can have a limited vertical movement, sufficient to take up the jar occasioned by uneven ground, and I have found in practice that the usual saddle-springs can be dispensed with and the saddle attached directly to the seat-post.

The handle-bars, instead of being made of rigid material, are preferably constructed of spring-steel, so that the jar upon the steering-head will be taken up and not communicated to the arms of the rider.

It will thus be seen that I provide a bicycle in which the tire is not subject to the objections of a pneumatic tire, and yet I secure all of the advantages which a pneumatic tire can give to a bicycle, and by means of my peculiarly-constructed frame I secure all of the elasticity and ease which a pneumatic tire can give to a bicycle.

Having thus described my invention, what I claim, and desire to secure by Letters Patent, is—

In a bicycle, a frame comprising the forward portion, E, formed by the steering-head, $c$, and the parallel members, $c'$ $c'$, connected at their rear by the bow, $b^2$, and the triangular portion, D, composed of two parallel sections, $d$, connected to the parallel section, $d^4$, by means of the connection, $d^2$, the sections, $e^4$, forming the backbone of the said triangle, the lower end of the said section, $e^4$, being attached to the springs, the other ends of said springs being attached to the plates, $d^5$, a spring, H, for supporting the forward end of the said triangular frame, D, the forward end of said spring being attached to the lower member of the said rectangular frame, E, and a frame, G, forming the rear support for the rectangular frame, substantially as set forth and described.

In testimony whereof I affix my signature in the presence of two witnesses.

HERMAN WILLIAM HOEFT.

Witnesses:
JOHN JACOB ESCH,
WALTER C. WINTER.